3,539,849
SUBMERSIBLE MOTOR FOR SUBMERSIBLE
PUMP
George W. Kampfen, San Jose, Calif.
(410 N. Monterey St., Morgan Hill, Calif. 95037)
Filed June 2, 1969, Ser. No. 829,321
Int. Cl. H02k 5/12
U.S. Cl. 310—67                                                          18 Claims

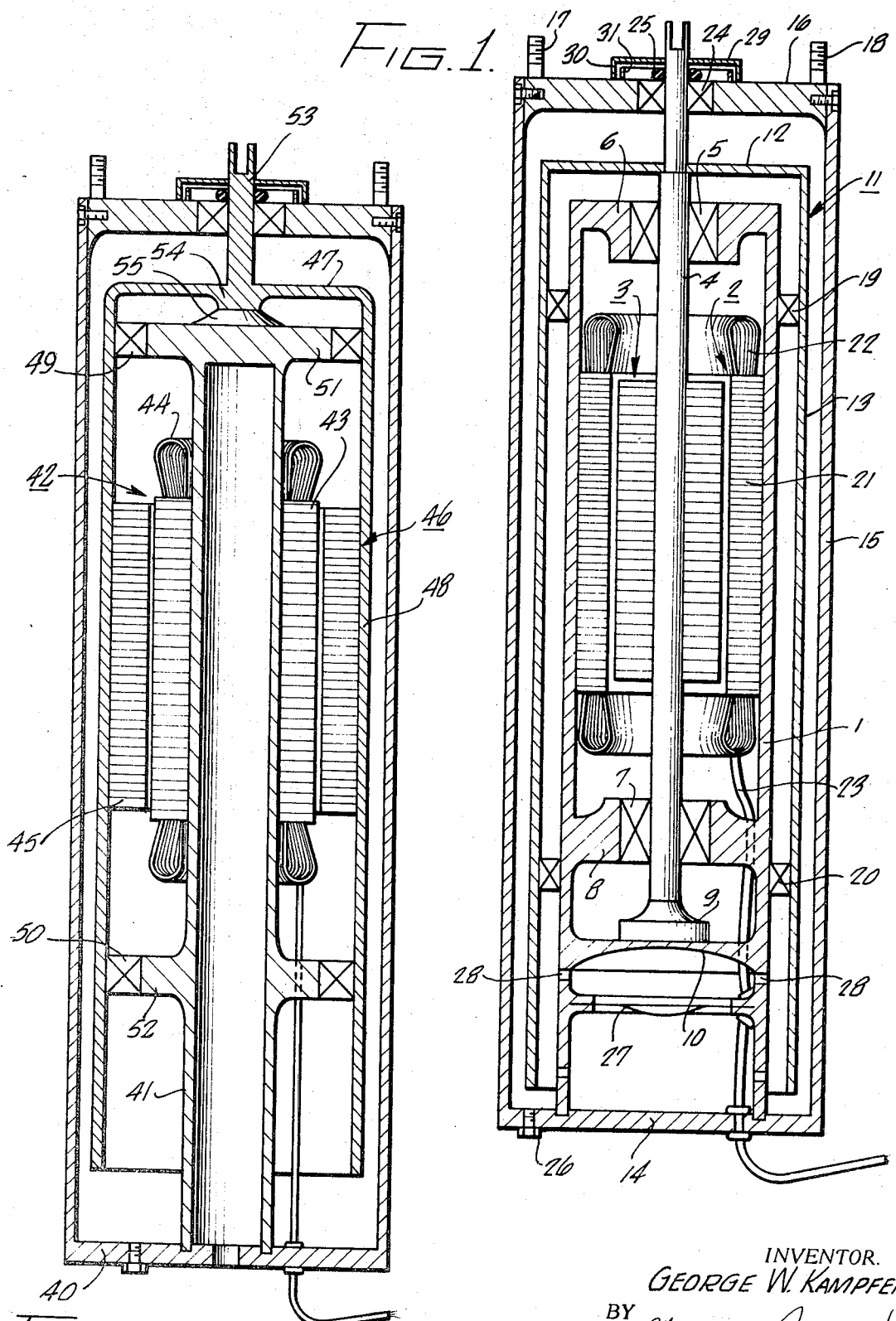

ABSTRACT OF THE DISCLOSURE

An electrical device, which is particularly useful in a well for driving a submerged pump, has a housing or baffle that rotates with the rotor element which makes shaft seals unnecessary. The rotor element may be mounted on a shaft, with the housing being cylindrical in shape with one closed end securely attached in a watertight manner to the shaft. Alternatively, the rotor element may be mounted on an inner surface of the housing with no shaft extending internally in the motor.

BACKGROUND OF THE INVENTION

Field of the invention

This invention relates to electrical devices having means for keeping unwanted fluids away from the electrical windings in the device, and more particularly, to such devices especially adapted to be submerged with submersible pumps for driving the pumps.

Description of the prior art

Electrical devices having means for excluding unwanted fluid from the electrical windings when, for example, the device is submerged for driving a submerged pump, fall into two general categories. These are: water-filled motors and oil-filled motors, both of which generally have a limited life.

These motors may be used in wells at a depth of more than 2000 feet, and thus, it may be a relatively expensive proposition to remove a motor for service or replacement. Additionally, the motors may have a power rating of up to 1000 horsepower or more, and can be very costly initially and, therefore, very expensive to replace.

The cause of failure of these motors is generally the means for excluding unwanted fluid from the electrical windings.

The water-filled motors generally have a bulky insulation system where the electrical field windings of the motor are encapsulated and encased in a housing. This housing inside the motor may take the form of a thin cylindrical sleeve attached at its ends to the frame supporting the stator. In operation, the heat that is generated is increased because of the encapsulation and the consequent inability of any fluid to circulate in and around the windings. This heat causes the thin sleeve to expand. When the motor is shut off the sleeve then contracts. This expansion and contraction continues as the motor cycles on and off in operation and may result in one of two types of failures. In one case, the sleeve may crack and permit the water to contact the electrical windings, thereby shorting out the motor. On the other hand, the expansions and contractions may cause wrinkles to appear in the sleeve which may protrude into the small clearance area between the rotor and stator and bind up the motor. In either case, the motor must be repaired or replaced. Additionally, in the water-filled motors, the water has to act as the lubricant and it is not nearly as efficient a lubricant as oil, and in particular some of the specialized dielectric oils designed for use in oil-filled motors.

In the oil-filled motors that are located in a well, for example, for driving a submerged pump, the unwanted fluid is kept from the electrical windings by a seal around the shaft. This seal is generally at the top end of the motor between the pump and the motor. There are two types of shaft seals, both of which have been known to fail.

One common shaft seal used with an oil-filled motor is a mechanical seal comprised of a carbon element and a ceramic element. In operation the pressure on the side of the seal exposed to the oil is slightly greater than the pressure on the outside of the seal so that there is a minute oil seepage through the seal. However, because of vibrations and friction wear, the mechanical seal wears out and becomes ineffective. Upon this occurrence, water enters the motor and soon reaches the windings, thereby shorting out the motor.

Another type of shaft seal used with an oil-filled motor is a mercury seal. The mercury seal is not only relatively expensive, but a critical balance must be maintained between the pressure of the fluid being pumped on one side of the mercury and the pressure of the oil within the motor on the other side of the mercury. In one type of oil-filled motor having a mercury seal, a tube is connected from the top of the motor in the area where the water or fluid to be pumped is located, to the bottom of the motor so that the pressure in the bottom chamber and on the oil in the motor is balanced with the pressure of the water on top of the motor. However, this tube may become plugged with silt and the pressure balance destroyed. Upon this occurrence, the water will force the mercury out of the seal and into the interior of the motor, with the highly conductive mercury shorting out the electrical windings. If the mercury does not short out the windings, the water that is then free to enter the motor will short out the windings, thereby causing a failure.

SUMMARY OF THE INVENTION

The disadvantages of the prior art devices employing bulky insulation systems with water lubrication, and those that employ shaft seals of either the mechanical type or mercury type with oil lubrication are overcome by the present invention in a simple and economical manner.

The electrical device in accordance with the present invention, which is useful as a prime mover for a submerged pump, comprises a support member, a frame attached to the support member and supported in a vertical position from its bottom end by the support member, at least one stator element attached to the frame, at least one rotor element cooperating with the stator element, a housing having a closed top end and vertical side walls extending downwardly around the frame to encompass at least the rotor element and the stator element and the bearing elements for the rotor, and means for coupling the housing to the rotor element.

In one embodiment, the means for coupling the housing to the rotor element comprises a shaft, with the rotor element attached, centrally located in the stator element and extending through an aperture in the closed end of the housing and means for securing the housing to the shaft in a watertight manner. The shaft is journalled in bearings supported by the frame above and below the stator element and rotor element. The vertical frame with attached stator elements and journalled shaft with attached rotor element, forms a typical motor. The housing attached to the shaft surrounds the basic motor and in cooperation with the oil, that fills the housing down to a depth from the closed end that extends at least below the bearing means, eliminates the need for a shaft bearing by keeping the pumped fluid, such as water, out of the interior of the motor in a simple and relatively inexpensive manner.

The device may additionally include vertical side walls on the support member that extend above the housing and terminate in an apertured end. The shaft extends through the end and a bearing means is positioned in the aperture to journal the shaft. For installation purposes, a temporary seal is located at the apertured end of the support member to prevent leakage of dielectric oil out of the device, which oil initially fills both the housing and the support member.

In another embodiment of the invention an electrical device of the type described above has a means for coupling the housing to the rotor element that comprises simply a means for attaching the rotor element to a surface of the housing in a cooperating relationship with the stator element. In this embodiment, there is no complete motor inside the housing, since the housing is part of the motor. The housing is journalled by bearing means supported by the frame above and below the stator and rotor elements.

Dielectric fluid, such as dielectric oil, fills the housing down to a depth from the closed end that extends at least below the bearing means. In operation, the dielectric oil may be held inside the housing by oil filling the space between the housing and the supporting member or by the fluid that is being pumped by the pump driven by the motor, such as water. The support member may also be constructed as above to include vertical side walls and an apertured end initially sealed to prevent leakage of the dielectric fluid out of the device.

In another embodiment of the invention the electrical device may be a combination of the devices described above. In this case, the device comprises a first rotor element attached to a shaft centrally located inside two stator elements and a second rotor element attached to an inside surface of the housing and positioned to cooperate with the outside stator element. This device may also have a support member with vertical side walls and an apertured end through which the shaft of the device extends and means for initially sealing the apertured end to prevent leakage of dielectric oil.

BRIEF DESCRIPTION OF THE DRAWING

The above and other features and advantages of the present invention may be understood more fully and more clearly upon consideration of the following specification and drawing, in which:

FIG. 1 is an elevation view in section of an electrical device in accordance with the present invention; and FIG. 2 is an elevation view in section of an alternative embodiment of the device of the present invention.

DESCRIPTION OF THE PREFERRED EMBODIMENTS

In FIG. 1 there is shown an electrical device having a rigid frame 1 which supports the stator element 2. Cooperating with the stator element 2 is a rotor element 3 for driving a device mechanically coupled to the electrical device of FIG. 1. The rotor element 3 is attached to a longitudinal shaft 4 that is centrally located inside the stator element 2. The longitudinal shaft 4 is journalled above the stator element 2 and rotor element 3 by bearing means 5 schematically shown in FIG. 1.

The bearing means in the device may be sleeve bearings, ball bearings, or roller bearings or some similar bearing means. The bearing means 5 is supported by the end wall 6 of frame 1. The shaft 4 is further journalled by bearing means 7 below the rotor element 3 and stator element 2. Bearing means 7, which is also schematically shown in FIG. 1, is supported by inward extensions 8 of frame 1. The shaft 4 terminates in a thrust bearing 9, which is schematically shown in FIG. 1 and which is supported by an inward extension 10 of the frame 1 located below extension 8. The elements inside the frame 1 form a basic motor with the shaft 4 extending beyond the dimensions of the motor for coupling to a device to be driven by the motor.

The device of FIG. 1 further includes a baffle or housing 11, which preferably has a thin-walled, lightweight construction. Housing 11 has a closed end 12 that is securely attached to the shaft 4 in a watertight manner. With the device in a vertical position as shown in FIG. 1, any fluid that passes downwardly along the shaft 4 above the housing 11 will pass over the closed end of the housing 11 and the vertical walls 13 of the housing 11 so that the housing acts as a shield around the elements therein.

The frame 1 is attached at its bottom end by some suitable means, such as welding, in a vertical position to a rigid support member 14. The rigid support member 14 has vertical side walls 15 that terminate in an apertured end wall 16 above the housing 11. End wall 16 may be removable for the insertion of the frame 1, husing 11, etc., or support member 14 may be separable near the bottom to facilitate the assembly of the device. On the end wall 16 of the support member 14 may be located means for attaching the device to a device that is to be driven. The attaching means may be bolts, such as bolts 17 and 18 shown in FIG. 1. The shaft 4 extends through the apertured end wall 16 and is journalled by bearing means 24 schematically shown in FIG. 1. Cooperating with the bearing means 24 to initially seal the support member 14 and the elements therein is an O-ring 25 positioned around the shaft 4 on top of the bearing means 24. Any other suitable seal for initially sealing the shaft at this location may be used.

The device of FIG. 1 is initially filled with dielectric fluid such as a dielectric oil through the opening in the bottom of support member 14 that is closed by fill plug 26. This opening may be located anywhere on the side, top, or bottom of the support member, but it is preferably located so that when the dielectric oil is put in the device and especially inside the housing 11, that no air spaces remain but the oil fills all of the space. This is to insure the best lubrication of the bearings and insulation of the electrical windings and to avoid possible failure thereof.

The housing 11 will rotate with the shaft 4 and may advantageously be spaced a fixed distance from the frame 1 along the length of the side walls 13 by bearing means 19 and 20 positioned between the frame 1 and housing 11. These bearing means 19 and 20 will journal the rotatable housing 11 and tend to eliminate any vibration or oscillations in the side wall 13 of the housing 11 which is suspended from its top end wall 12.

The stator element 2 includes laminated pole shoes 21 and exposed electrical field windings 22. The electrical windings 22 are connected to electrical leads 23 which carry the power to the windings 22 for driving the rotor 3 and shaft 4. The motor of the electrical device in FIG. 1 may typically be an alternating-current induction motor of the single-phase or multi-phase type. Also, the rotor element 3 may be a typical squirrel cage rotor for an alternating-current induction motor. The wire leads 23 extend downwardly through holes (not shown) in inward extension 8 and inward extension 10 and out through the bottom of support member 14 for connection to an external source of electrical power.

When the device is submerged in a fluid, such as water in a well, for driving a submerged pump, it is necessary that the water or other pumped fluid not come in contact with the electrical windings 22 of the stator 2. It is further desirable that the water not come in contact with the bearing means 5, 7, and 9. When initially installed the device of FIG. 1 is filled with the dielectric fluid. However, when in operation down in a well, for example, driving a pump for pumping water, the water will be initially excluded from the interior of the device by the O-ring 25. After a period of operation, the O-ring may disintegrate thereby permitting water to flow down the shaft 4 and into the space between housing 11 and support member 14. This water will force the dielectric oil out of this space and it will flow down the vertical side walls 13 of housing 11 to the bottom of the support member 14. As the water comes around the lower edge of the housing 11 it will be restrained by the dielectric oil inside the housing. This oil will float on the water and will remain inside the housing to insulate the electrical windings and to lubricate the bearings therein. The dielectric oil in the housing and the water in the bottom of the support member 14 may be separated inside the frame 1 by a diaphragm 27. Alternatively, the diaphragm may not be used and the oil inside the frame permitted to float on the water. In either case, the housing 11 and the oil therein cooperate to restrain the unwanted fluid and to keep it from the electrical winding 22 and the bearings 5, 7, and 9 in an efficient and inexpensive manner without any expensive and troublesome shaft seal.

For circulation of the oil contained inside the housing 11 and inside the frame 1, the end wall 6 may have a spoked construction with several openings therein and the inward extensions 8 and 10 may have a similar spoked construction. Additionally, for the circulation of the dielectric oil, openings 28 may be provided around the periphery of the frame 1 below the inward extension 10. Thereafter, the dielectric oil may freely flow between the stator 2 and rotor 3 through the end wall 6 in the space between the housing 11 and frame 1 through the openings 28 and the openings in the inward extensions 10 and 8. This flow of oil will provide some cooling for the device.

To prevent the entering of sand or grit into the interior of the support member 14 a means for repelling the sand and grit may be provided on top of the end wall 16 of support member 14. Such a means is shown in FIG. 1 and includes a cap 29 attached to the shaft 4 and having vertical side walls 30. Inside the vertical side walls 30 and cooperating therewith to form a labyrinth seal is a short cylindrical element 31 attached to the end wall 16.

The electrical device of FIG. 1 differs from the presently-known devices that are useful as submerged motors for driving submerged pumps in that no shaft seal is required to protect the electric windings from unwanted fluids and also in the manner in which the elements are supported. As seen from FIG. 1 the elements are supported from the bottom by the support element 14 as distinguished from being supported from the top as is done in the presently-known devices. Additionally, the electrical leads for the device come out of the bottom of the device for connectiton to the external source.

As an alternative to the construction of the electrical device in FIG. 1, the electrical device may have a baffle or housing that is driven electrically rather than mechanically. Such a device is shown in FIG. 2. There is shown in FIG. 2 a rigid frame 41 attached to and supported by a support member 40. The device is shown in the vertical position which is the position in which it is usually operated when submerged in a well. The frame 41 supports a stator element 42 having laminated pole shoes 43 and electrical windings 44 wound on the pole shoes 43. Positioned around the stator 42 and cooperating therewith is a laminated rotor element 45. The rotor element 45 is attached to and carried by a baffle or housing 46. The housing 46 is a relatively rigid member having a closed end 47 and a vertical cylindrical side wall 48 to which the rotor element 45 is attached.

The housing 46 is journalled near its top end and near its bottom end by bearing members 49 and 50, respectively, which are schematically shown in FIG. 2. The bearing means 49 is supported by an outward lateral extension 51 of frame 41 and bearing means 50 is supported by an outward lateral extension 52 of the frame 41.

The housing 46 has a vertical shaft extension 53 for coupling the device to the device that is to be driven. Additionally, the housing 46 includes a downwardly extending portion 54 that rests in a thrust bearing 55 which is schematically shown in FIG. 2. The thrust bearing 55 is supported by the frame 41 and is shown in FIG. 2, as being supported at the top of the frame 41. However, the downwardly extending portion 54 of the housing 46 may extend down inside the frame 41 with the thrust bearing 55 being located in a lower position.

The operation of the device in FIG. 2 is the same as the operation in FIG. 1, wherein it is initially completely filled with dielectric fluid such as dielectric oil. During operation the oil in the space between the frame 41 and support member 40 may be replaced by water which will seek a level inside the housing 46 near the lower end of the housing. Thereafter, the dielectric oil inside the housing will float on this water and will be retained inside the housing.

An alternative electrical device, not shown in the drawings, may incorporate features of the devices of FIGS. 1 and 2 wherein two rotor elements and two stator elements are employed with the inside rotor element being attached to a shaft as in FIG. 1 and the outside rotor element being attached to a housing as shown in FIG. 2. Such a device would operate in the same manner as the devices shown in FIGS. 1 and 2.

Various changes may be made in the details of construction without departing from the spirit and scope of the invention as defined by the appended claims.

What is claimed is:

1. A submersible structure including a motor adapted to drive a pump when submerged in well liquid, said structure comprising a housing closed at its bottom end and having an apertured top end that is initially liquid-tight for installation in a well, and a motor mounted within said housing and having a rotor shaft extending through the aperture in the top end of said housing, said motor comprising a frame attached at its bottom end to the bottom end of said housing and extending vertically within said housing, at least one electrical stator element attached to said frame, at least one electrical rotor element cooperating with said stator element to provide motor action, a baffle having a closed top end and vertical side walls extending downwardly around said frame to encompass at least the stator element and the rotor element, and means for coupling said baffle to said rotor element.

2. A submersible structure including a motor adapted to drive a pump when submerged in well liquid, said structure comprising a housing closed at its bottom end and having an apertured top end that is initially liquid-tight for installation in a well, and a motor mounted within said housing and having a shaft extending through the aperture in the top end of said housing, said motor comprising a shaft, a rotor attached to the shaft, a frame, a stator cooperating with the rotor and supported by the frame, journal bearings supporting and journalling said shaft, said bearings being supported by the frame, a thrust bearing at the end of the shaft within the frame and supported by the frame, a cylindrical baffle closed at one end and securely attached at the closed end to the shaft on the outside of said frame, said baffle extending along the length of said frame for a distance including the area of the frame wherein the stator, journal bearings, and thrust bearings are located, and means for mounting the motor frame to the bottom end of said housing.

3. A submersible device comprising an electrical motor having its outer body open at the bottom end and closed in a liquid-tight manner at the top end; means for coupling the driven element of the motor to an external device to be driven by the motor, said coupling means extending beyond the outer body of the motor; a housing for the motor, the housing having a closed bottom wall, closed side walls and an apertured top wall, said coupling means extending through the aperture in the housing; means for mounting the outer body of the motor vertically in the housing with the bottom end of the outer body being separated from the bottom end of the housing; and means for sealing the aperture of the housing in a liquid-tight manner during installation of the device.

4. An electrical device comprising a support member, a frame attached at its bottom end to the support member and supported in a vertical position, at least one electrical stator element attached to said frame, at least one electrical rotor element cooperating with said stator element, a housing having a closed top end and vertical sides extending downwardly around said frame to encompass at least the stator element and rotor element, means for coupling said housing to said rotor element, said coupling means including a shaft extending through the center of the closed end of said housing and being attached thereto in a liquid-tight manner, means for attaching the rotor element to said shaft in a cooperating relationship with said stator element, a first bearing means supported by said frame above said stator and rotor elements for journalling said shaft, second bearing means supported by said frame below said stator and rotor elements for journalling said shaft, and thrust bearing means supported by said frame below said second bearing means for supporting the end of said shaft.

5. An electrical device in accordance with claim 4 further including a dielectric fluid in the interior of said housing at a depth from said closed top end that extends below said thrust bearing means.

6. An electrical device comprising a support member, a frame attached at its bottom end to the support member and supported in a vertical position, at least one electrical stator element attached to said frame, at least one electrical rotor element cooperating with said stator element, a housing having a closed top end and vertical sides extending downwardly around said frame to encompass at least the stator element and rotor element, means for coupling said housing to said rotor element, a shaft for coupling said electrical device to an external device, said support member having a closed bottom end and closed vertical side walls extending above said housing and terminating in an end wall, an aperture in said end wall, said shaft extending above the top end of said housing and being attached thereto and extending through the aperture in said support member, bearing means positioned in said aperture for journalling said shaft, and means for initially making said bearing means and said aperture liquid-tight.

7. An electrical device comprising a support member, a frame extending vertically from said support member and attached at its bottom end to and supported by said support member, a stator element having field poles and electrical windings attached to the inner surface of said frame, a longitudinal shaft concentrically located in the upper portion of said frame, bearing means supported by said frame above and below said stator for journalling said shaft, a rotor element attached to said shaft and cooperating with said stator to form an electric motor, a thrust bearing means attached to said frame below the lower bearing means for supporting the end of said shaft, a cylindrical housing having a closed top end around said shaft and attached thereto in a watertight manner and vertical side walls extending downwardly around said frame for a distance including at least said bearing means and said thrust bearing, and dielectric fluid located in said housing for a depth from the closed top end that extends at least below said thrust bearing means.

8. An electrical device in accordance with claim 7 wherein the support member has vertical side walls extending above said housing and terminating in an end wall having an aperture located therein with the shaft extending through the aperture, and further including bearing means positioned in said aperture for journalling said shaft, and means at the end wall of said support member for initially sealing in a watertight manner the area around said shaft at the end wall of said support member.

9. An electrical device comprising a support member, a frame extending vertically from said support member and attached at its bottom end to and supported by said support member, said frame having an attaching surface along a portion of its length and two outwardly extending bearing supports above and below said surface, a stator element having field poles and electrical windings attached to the outer surface of said frame along said attaching surface, a cylindrical housing having a closed end and vertical side walls extending downwardly around said frame over a distance that includes both bearing supports of said frame, said housing having a downward extension centrally located on the closed end, a thrust bearing supported by said frame for supporting said housing at the end of said downward extension, bearing means supported by said bearing supports of said frame for journalling said housing, rotor elements attached to the inside surface of said housing and cooperating with said stator element to form an electric motor having a rotor concentrically positioned around the stator, a shaft attached to and extending vertically from the closed end of said housing, and dielectric fluid positioned in said housing from the closed end to at least a depth encompassing the bearing means journalling said housing.

10. An electrical device in accordance with claim 9 wherein the support member has vertical side walls extending above said housing and terminating in an end wall having an aperture through which the shaft extends and further including bearing means positioned in said aperture for journalling said shaft, and means at the end wall of said support member for initially sealing in a watertight manner the area around said shaft at the end wall of said support member.

11. An electrical device comprising a main housing having a first end and a second end, a frame rigidly attached to said housing at said second end and supported within said housing, said frame having a partially closed end wall, a first intermediate inwardly extending bearing support forming a first chamber in the frame between said first bearing support and said end wall, and a second inwardly extending bearing support between said first support and the second end of said housing, stator poles and windings attached to the inner surface of said frame within said chamber, a thrust bearing mounted on said second inwardly extending bearing support, a shaft extending beyond the end wall of said frame terminating in said thrust bearing, a first bearing means supported by said end wall for journalling said shaft, second bearing means supported by said first bearing support for journalling said shaft, a rotor mounted on the shaft adjacent the stator poles and windings and cooperating therewith to form a motor, a baffle securely attached to the shaft outside said frame and within said housing and extending along said frame over a length that encompasses at least said second inwardly extending bearing support of said frame.

12. An electrical device comprising a shaft, a rotor attached to the shaft, a frame, a stator cooperating with the rotor and supported by the frame, journal bearings supporting and journalling said shaft, said bearings being supported by the frame, a thrust bearing at the end of the shaft within the frame and supported by the frame, a cylindrical baffle closed at one end and securely attached at the closed end to the shaft on the outside of said frame, said baffle extending along the length of said frame for a distance including the area of the frame wherein the stator, journal bearings, and thrust bearing are located, and means for mounting the motor frame.

13. A submersible electrical device including a motor for driving a submersible pump comprising a housing having a first end and a second end, a rigid frame attached to and supported by the second end of said housing and extending inwardly of said housing, said frame having an end bell at the end remote from said second end of said housing and at least two inwardly extending bearing supports positioned in said frame and separated from said end bell a sufficient distance to provide space for the stator and rotor, a stator attached to the inner surface of said frame between the end bell and the bearing supports, a shaft extending longitudinally in said frame and beyond said end bell for driving said pump, a rotor connected to said shaft and cooperating with said stator to rotate said shaft, first bearing means journalling said shaft and supported by said end bell, second bearing means journalling said shaft on the side of said rotor and stator opposite the end bell and supported by one of said bearing supports, a thrust bearing positioned beyond the second bearing means from the rotor and stator and supporting the end of said shaft and being supported by the second of said bearing supports, a cylindrical baffle having a closed end and extending between said frame and said housing for a distance less than the total length of the housing, said baffle being securely attached at its closed end to said shaft.

14. A device in accordance with claim 13 further including bearing means positioned between said frame and said baffle to journal said baffle.

15. A device in accordance with claim 13 further including bearing means positioned between said baffle and said housing to journal said baffle.

16. A device in accordance with claim 13 further including a diaphragm mounted across the frame between the second end of said housing and the bearing support for said thrust bearing.

17. A device in accordance with claim 16 further including passageways for fluid from the space between said baffle and said frame, through the space between said diaphragm and said end bell and through said end bell back to the space between said baffle and said frame.

18. A device in accordance with claim 13 further including oil in the space between said baffle and said frame and inside said frame.

References Cited

UNITED STATES PATENTS

| | | | |
|---|---|---|---|
| 2,293,616 | 8/1942 | Myers | 310—87 |
| 3,356,874 | 12/1967 | Chiaparelli et al. | 310—67 X |
| 3,369,136 | 2/1968 | Sanger | 310—87 |

FOREIGN PATENTS 851,597  8/1952  Germany.

DONOVAN F. DUGGAN, Primary Examiner

U.S. Cl. X.R.

310—87; 103—87